United States Patent [19]

Morioka et al.

[11] Patent Number: 4,847,710

[45] Date of Patent: Jul. 11, 1989

[54] MULTITRACK RECORDING APPARATUS WHICH STOPS THE RECORDING MEDIUM ON THE BASIS OF RECORDED MUSICAL TIMING DATA

[75] Inventors: Kazuo Morioka, Higashikurume; Takashi Kokubo, Tokyo; Youichi Imazeki, Higashikurume; Hideharu Murayama, Iruma, all of Japan

[73] Assignee: CITEC Corporation, Tokyo, Japan

[21] Appl. No.: 935,485

[22] Filed: Nov. 26, 1986

[51] Int. Cl.[4] .............................................. G11B 15/52
[52] U.S. Cl. ..................................... 360/72.2; 360/18; 360/27; 360/74.4; 84/1.03
[58] Field of Search ...................... 360/72.2, 74.4, 27, 360/18; 84/1.03

[56] References Cited

U.S. PATENT DOCUMENTS

| | | | |
|---|---|---|---|
| 3,714,382 | 1/1973 | Sykes ................................... | 360/72.2 |
| 3,821,710 | 6/1974 | Arciprete et al. .................. | 360/72.2 |
| 4,237,498 | 12/1980 | van Eijck et al. ................. | 360/74.4 |
| 4,316,224 | 2/1982 | Hansen et al. ..................... | 360/72.2 |
| 4,333,113 | 6/1982 | Kalinowski .......................... | 360/27 |
| 4,406,203 | 9/1983 | Okamoto et al. .................. | 84/103 |
| 4,474,098 | 10/1984 | Pepersack et al. ................ | 84/1.03 |
| 4,636,879 | 1/1987 | Narita et al. ....................... | 360/72.2 |
| 4,700,604 | 10/1987 | Morikawa et al. ................. | 84/1.03 |

FOREIGN PATENT DOCUMENTS 56-93157 7/1981 Japan ..................................... 360/18
57-55579 4/1982 Japan ..................................... 360/27

OTHER PUBLICATIONS

White, "ASCII-Compatible Time-Code System for Motion-Picture Films using Microcomputers," SMPTE Journal, vol. 85, No. 1, pp. 9-15, Jan. 1976.
Jungleib, "The Complete SCI MIDI," published by Sequential Circuits, Inc. (1983), pp. 1-27.

Primary Examiner—John H. Wolff
Assistant Examiner—Matthew J. Bussan
Attorney, Agent, or Firm—Spencer & Frank

[57] ABSTRACT

A multitrack recording apparatus includes a multi-channel recorder for recording musical timing data on a recording medium, a modulator for variably setting a recording cycle of the musical timing data, and a keyboard for designating a desired search position of the recording medium according to the musical timing data. The apparatus also includes a reproduction head for reproducing the musical timing data from the recording medium, a controller for calculating the driving position of the recording medium on the basis of the reproduced musical timing data and for controlling the driving of the recording medium to stop the recording medium at the designated search position, and a dispaly unit for displaying musical data on the basis of the reproduced musical timing data.

12 Claims, 2 Drawing Sheets

MULTITRACK RECORDING APPARATUS WHICH STOPS THE RECORDING MEDIUM ON THE BASIS OF RECORDED MUSICAL TIMING DATA

BACKGROUND OF THE INVENTION

The present invention relates to a multitrack recording apparatus for accurately searching a desired position of a recording medium such as a magnetic tape at high speed.

Tape recorders have been very popular as conventional apparatuses for recording speech, music, and other data. Conventional tape recorders can be classified as cassette or open-reel tape recorders. In either type, a tape counter for indicating the travel length of the tape, or a time indicator for indicating the travel time of the tape, is selectively provided as means for detecting the current tape position in the recording or reproduction mode. However, when one is searching for a given tape position, the tape counter or the time indicator cannot give accurate position information due to elongation and slippage of the tape.

In order to achieve an extremely accurate search for a desired tape position as required by miltitrack recording or cueing at a broadcast station, in accordance with one conventional technique a pulse signal (e.g., if the number of beats per is 200 and the pulse period is 1/96 of a quarter note, the signal frequency is 320 Hz) of a regular period is recorded on one channel of the tape. The pulses of this signal are counted to search the current tape position. According to another conventional tape position detection technique, the time elapsed from the beginning of the music or data is recorded in a specific channel for every predetermined time interval. According to these methods, accurate position detection can be performed compared to detection using a tape counter or time indicator. The technique using the pulse signal, however, imposes limitations on the recording or reproduction frequency (about 20 kHz). The maximum frequency of the pulse signal is limited, and the pulse signal cannot be accurately detected due to tape loosening during starting and stopping of the tape, The tape position detection precision, therefore, cannot be satisfactory.

Conventional multitrack musical recording will be exemplified below. Sync clock signals and click tones must be recorded on both end channels prior to musical recording. Tones from a rhythm sound source (e.g., a drum or bass) are recorded on another channel on the basis of the clock signals and the click tones. Tones from an ensemble sound source (e.g., brass and strings) are recorded on still another channel. In this case, assume that recording is started from an intermediate position. According to a conventional time counting technique, the time between the start position to the intermediate position is checked in advance. The tape is fast forwarded to near the desired position by using a stop watch or the clock signal prerecorded on one channel. When the tape comes near the desired position, it is driven at the normal speed. An operator then monitors the tape with headphones and searches for the desired position. This operation is cumbersome and time-consuming. In addition, since all musical measures do not have an identical period of time, the time data does not always provide accurate position detection.

When a musical piece created by a music sequencer or computer is to be recorded in synchronism with music prerecorded on a tape from the beginning, the clock signal recorded on the tape is used to achieve easy synchronization. However, synchronous recording of the musical piece from an intermediate portion of music already recorded on a tape is very difficult as described above. Moreover, it is impossible to control external music generating equipment, such as a music sequencer and computer, from a tape recorder for the same reason as described above.

SUMMARY OF THE INVENTION

The present invention has been made in consideration of the above situation, and has as its object to record data on a recording medium such as a magnetic tape so as to permit accurate position detection based on the fact that data representing several timings such as measures and time (the data to be referred to as musical timing data hereinafter) are included on the recording medium along with the musical data. The musical timing data includes timing data which are to be converted into measure, time, etc., such as SEMPTE's (Society of Motion Picture and Television Engineers) time code.

In one embodiment of the invention the musical timing data are measure data, each of which identifies a respective measure by measure number and is recorded on the tape where the respective measure is to start. For example the first measure data (a digital one between start and end marks) is recorded on the tape at the start of the first measure and, after a space, the second measure data (a digital two between start and end marks) is recorded at the start of the second measure, etc. The previously-described conventional pulse counting technique is unreliable without human monitoring because of read errors which occur when the tape is moved at high speed, but the measure data avoid this problem. During a tape position search the measure data are initially detected as pulses which are counted during high speed operation to get the tape near the desired measure number, and thereafter the tape is slowed so that the contents of the measure data can be examined until the desired measure is found.

BRIEF DESCRIPTION OF THE INVENTION

DETAILED DESCRIPTION OF THE PREFERRED EMBODIMENT

The present invention will be described in detail with reference to the accompanying drawings.

Figure 1:
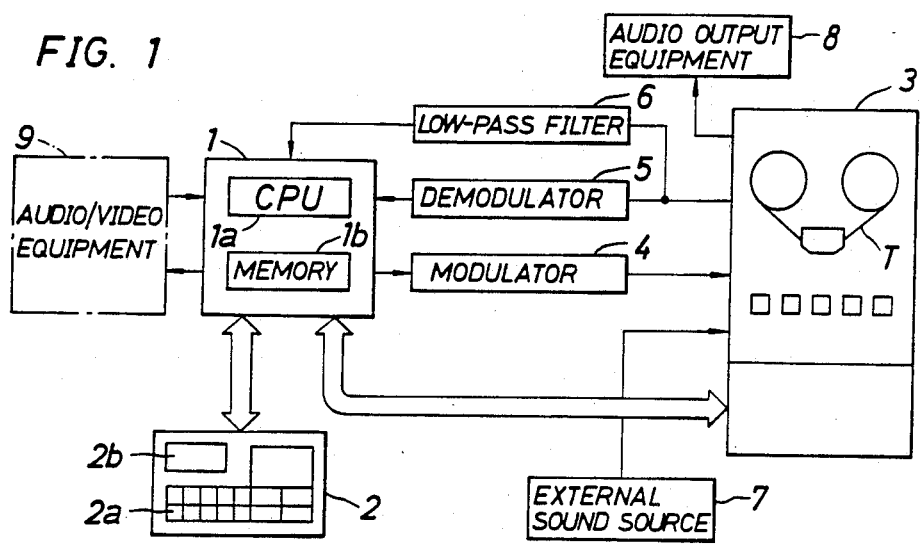
FIG. 1 is a schematic diagram showing a multitrack recording apparatus according to an embodiment of the present invention.

FIG. 1 is a block diagram of a multitrack recording apparatus using a magnetic tape as the recording medium according to an embodiment of the present invention. A controller 1 includes a CPU 1a and a memory 1b. A control panel 2 includes a keyboard 2a for setting a time signature (e.g., four-four time; as is known in the music field, a time signature identifies the number of beats per measure and the type of note which establishes the time unit for the beats) and a desired tape position and a display unit 2b for displaying musical data such as a measure number. A tape T is loaded in a multi-channel recorder 3. The recorder 3 includes a record head (not illustrated) for recording musical timing data together with speech, music, and other data on the tape T and a reproduction head (not illustrated) for reproducing the recorded data. The musical timing data is recorded at periodic intervals and will be discussed in more detail later. A modulator 4 modulates musical timing data from the controller 1 according to FSK (frequency shift keying). A demodulator 5 demodulates the musical timing data reproduced by the recorder 3. Reference numeral 6 denotes a low-pass filter; reference number 7 denotes an external sound source such as a music sequencer or an electronic musical instrument; and reference number 8 denotes audio output equipment such as a mixer, an effector, or a loudspeaker. Audio/video equipment 9 is operated in synchronism with music recorded by the multitrack recording apparatus. The audio/video equipment 9 may have MIDI (Musical Instruments Digital Interface) and SMPTE (Society of Motion Picture and Television Engineers) input/output terminals.

Assume that music is multi-recorded by the apparatus of this embodiment. In order to search for a tape position, various types of musical timing data can be prerecorded on the tape T. For example, if the duration of a quarter note is divided into 48 intervals each presenting unit time data, almost all musical data can be expressed using the unit time data. The most simple and effective musical timing data will be described below.

Figure 2:
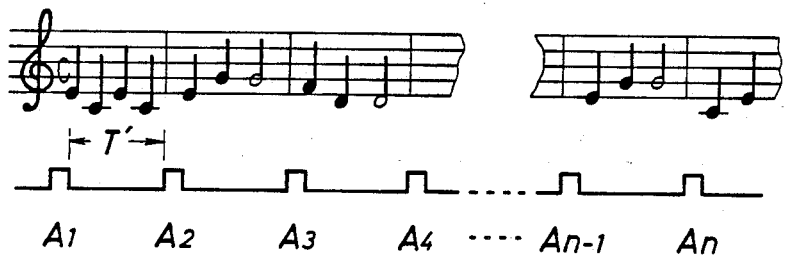
FIG. 2 is a view showing the relationship between the notes and the measure data used in the present invention.
Figure 3:
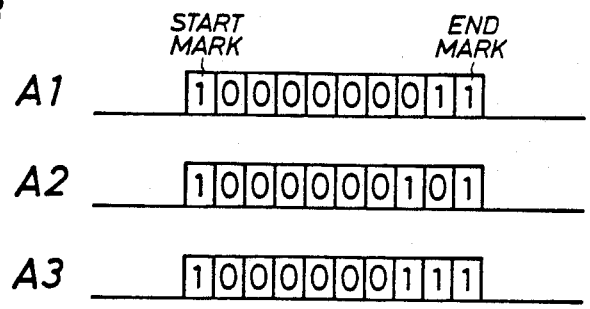
FIG. 3 shows measure data.

"Measure data" is defined as data A1, A2, . . . , An . . . representing the start position of each measure shown in FIG. 2, and more specifically each measure number. Each measure data consists of a 8-bit data block surrounded by start mark "1" and end mark "1", as shown in FIG. 3. Measure data A1, A2, and A3, respectively representing the first, second, and third measures, are exemplified in FIG. 3. The time duration of the data block can vary according to the music to be recorded. A space T' (nonsignalling time) must be inserted between two adjacent measure data.

The measure data are generated at a timing that is determined by frequency-dividing the output from an oscillator (not illustrated) in the controller 1. Quarter notes, etc., are each assigned a predetermined duration, such as one second for a quarter note, and the output from the oscillator is divided accordingly. When a desired time signature (e.g., four-four or six-eight time) is set at the keyboard 2a, the measure data are output from the controller 1 at corresponding time intervals. If a four-four time signature were entered, for example, the start mark "1" for the measure data A1 (for the first measure) would be generated, followed by an eight bit data block (0000 0001) which identifies the first measure, followed by an end mark "1." Thereafter the output of controller 1 is continuously held at digital "0" until the elapse of a period corresponding to four times the predetermined duration of a quarter note (four times the duration of a quarter note being the duration of the measures in four-four time), whereupon the start mark "1" for the measure data A2 is generated. As each measure data is generated, the FSK modulator 4 generates a first frequency during digital "0's" and a higher second frequency during digital "1's." Modulator 4 detects the end mark and, during the non-signalling time T' before the appearance of the next start mark, holds at digital "0." The non-signalling time T' must be longer than the interval between the start and end marks of a measure data (the interval of one cycle of a first lower frequency) to allow proper detection of the measure data. The output signal from demodulator 4 during the measure data A1 is illustrated (except for the start and end marks) in FIG. 6A. These frequencies are recorded on the first track of tape T. Measure data modulation can, of course, be achieved by a technique other than frequency shift keying.

Figure 4:
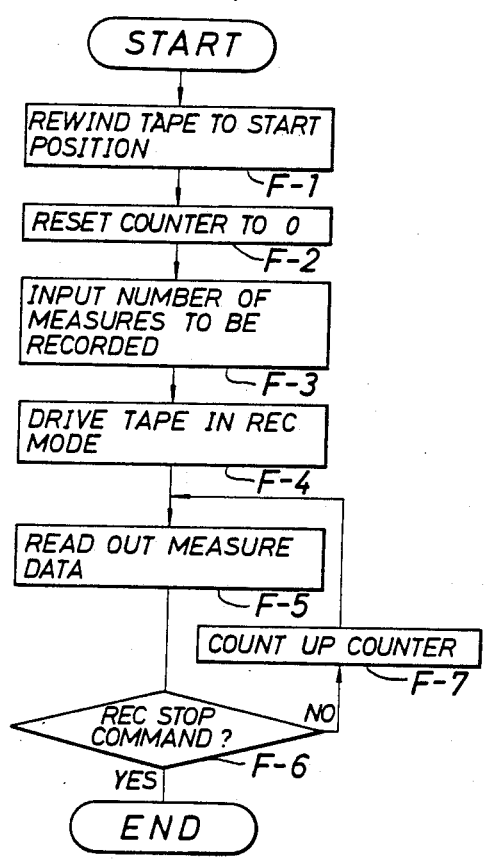
FIG. 4 is a flow chart of musical timing data recording by the apparatus shown in FIG. 1.

FIG. 4 is a flow chart when the measure data is recorded on the tape.

The tape is rewound to the start position (top) in step F-1 and a counter (not illustrated) in the controller 1 is reset to 0 in step F-2. The number of measures to be recorded is input at the keyboard 2a in step F-3. The recorder 3 is set in the recording mode and is driven at the normal speed in step F-4. The measure data is read out from the memory 1b in the controller 1 while the tape is driven at the normal speed (F-5). The readout measure data is FSK-modulated by the modulator 4 and the modulated data is recorded on the tape T. This operation continues until a recording stop command of the measure data is generated (F-6). Meanwhile, the count of the counter is incremented one by one in step F-7. The recording stop command is generated when the last measure data of the number of measure data preset in step F-3 is recorded.

Figure 5:
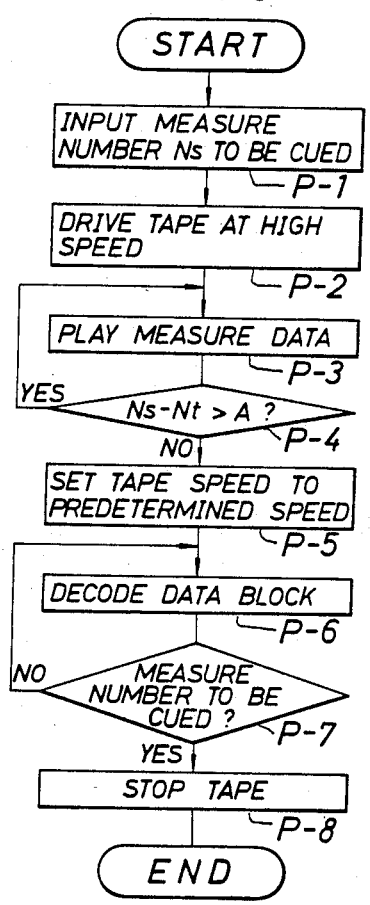
FIG. 5 is a flow chart of measure search operation by the apparatus shown in FIG. 1.

A measure search using the measure data will be described with reference to FIG. 5.

Figure 6A:
FIGS. 6A and 6B are timing charts for explaining the readout measure data and the processed output.
Figure 6B:

A measure number Ns to be cued is input at the keyboard 2a in step P-1. The number as the musical data is displayed on the display unit 2b. The tape is driven at a high speed in step P-2. The measure data recorded on the first track of the tape is reproduced by the reproduction head (not illustrated) in step P-3. A pulse signal having a duration corresponding to the block width of the measure data A1 is produced by the low-pass filter 6 and supplied to the controller 1. FIG. 6A shows the data block for the first measure, and FIG. 6B shows a pulse signal produced on the basis of this data block. The counter (not illustrated) in the controller 1 counts up the pulses. The measure numbers as musical data are sequentially displayed on the display unit 2b. When the count (Nt) of the counter reaches a value smaller by a predetermined number A (e.g., 4) than the measure number Ns to be cued (P-4), the tape speed is set at a predetermined speed for allowing the reproduction head to reproduce the data (P-5). The contents of the measure data reproduced by the reproduction head are decoded (P-6). The controller 1 checks if the contents coincide with the measure number to be cued (P-7). If YES in step P-7, the tape is stopped in step P-8. The contents of the data block are decoded after the tape is driven at the predetermined speed since the measure number cannot accurately be determined solely on the basis of the number of measure data (that is, the number of pulses as in FIG. 6B) due to starting condition variations during high speed driving and read errors. The stop position of the tape is the desired measure position.

In the above embodiment, the measure data is recorded as one of the musical timing data. However, the present invention is not limited to such recording. Data representing a predetermined beat in each measure, data representing a specific position in each measure, or musical timing data such as MIDI may be recorded in place of the measure data. MIDI (Musical Instrument Digital Interface) is an asynchronous serial interface, with one data word consisting of a start bit, eight data bits, and a stop bit, which was introduced for the purpose of permitting easy integration of synthesizers, other electronic keyboards, sequencers, etc., into one programmable system. The MIDI interface is described in further detail in Jungleib, "The Complete SCI MIDI," published by Sequential Circuits, Inc. (1983), pages 1-27. The musical timing data recorded in the tape may be generated by the recorder or may be supplied from external video/audio equipment. The musical timing data may be recorded in a form other than a digital signal. The present invention can also be applied to multi-recording using a recording medium such as a disk, without a magnetic tape.

According to the present invention as described above, musical timing data such as measure data are prerecorded on the recording medium. The prerecorded musical timing data is reproduced to search for a desired position on the recording medium. The desired position can be accurately detected at high speed, thus efficiently performing multitrack recording. The musical timing data recorded on the recording medium can be sent to automatic music playing units (e.g., a music sequencer, an electronic musical instrument, a mixer, or an effector) or external equipment (e.g., video equipment or a computer graphic unit). The music recorded on the recording medium can be synchronously played with other music or video information. The music recorded in the recording medium can be output in synchronism with other music and video information. The musical expressions can be used in a variety of applications and can be expanded to all artistic fields.

It will be understood that the above description of the present invention is susceptible to various modifications, changes and adaptations, and the same are intended to be comprehended within the meaning and range of equivalents of the appended claims.

What is claimed is:

1. A mulitrack recording apparatus for use with a recording medium, comprising:
   recording means for recording musical timing data on the recording medium at periodic intervals;
   means for variably setting a recording cycle of the musical timing data, said means for variably setting including first means for setting the time signature of music to be recorded, the time signature identifying a type of note, and for setting the duration of the type of note identified by the time signature, and second means for calculating the period of the musical timing data according to the time signature and duration set by the first means;
   search position designating means for designating a desired search position of the recording medium according to the musical timing data;
   reproducing means for reproducing the musical timing data from the recording medium;
   tape driving control means for calculating the driving position of the recording medium on the basis on the reproduced musical timing data and for controlling the driving of the recording medium to stop the recording medium at the designated search position; and
   display means for displaying musical data on the basis of the reproduced musical timing data.

2. An apparatus according to claim 1, wherein the musical timing data is measure data.

3. An apparatus according to claim 1, wherein the second means calculates the period of the musical timing data by using MIDI (Musical Instruments Digital Interface) standard data.

4. An apparatus according to claim 1, wherein the musical timing data has a sequence of numbers encoded therein, wherein the means for recording musical timing data comprises means for recording the musical timing data at periodic intervals, with one of the encoded numbers of the sequence being recorded on the medium during each periodic interval, and wherein the search position designating means comprises means for designating a desired search position of the recording medium according to a number encoded in the musical timing data.

5. A multitrack recording apparatus, comprising:
   a multi-channel tape recorder having a first forward speed and a second forward speed that is slower than the first forward speed;
   first means connected to the recorder for recording a sequence of digital data A1, A2, . . . , An at evenly spaced-apart positions on a predetermined channel of a tape, where A1 is the first data of the sequence, A2 is the second data of the sequence, and An is the nth data of the sequence, each digital data of the sequence having encoded therein a number which represents the numerical position of the respective digital data in the sequence;
   second means connected to the recorder for moving the tape to a predetermined digital data $A_i$ after the tape has been rewound, where $124 \geq i \geq n$, the second means including
   means for counting digital data as the tape moves at the first forward speed, and for slowing the tape to the second forward speed when the count plus a predetermined integer is equal to i, the predetermined integer being greater than one, and
   means for examining the number encoded in each of a plurality of digital data as the tape moves at the second speed, and for stopping the tape when the encoded number that is examined is i.

6. An apparatus according to claim 5, wherein the digital data are measure data which are recorded at the start of each measure of music.

7. An apparatus according to claim 6, further comprising means for selectively setting the duration of the measures in the music.

8. An apparatus according to claim 7, wherein the means for selectively setting comprises means for designating the time signature of the music.

9. An apparatus according to claim 8, wherein the time signature identifies a type of note, and wherein the means for selectively setting further comprises means for designating the duration of the type of note identified by the time signature.

10. An apparatus according to claim 5, wherein each digital data includes a start mark, and end mark, and a plurality of bits between the start and end marks, the bits between the start and end marks providing a binary number which identifies the numerical position of the respective digital data in the sequence.

11. An apparatus according to claim 10, wherein the first means comprises means for FSK modulating the digital data recorded on the tape, and the second means comprises means for low-pass filtering digital data read from the tape at the first speed and for FSK demodulating digital data read from the tape at the second speed.

12. An apparatus according to claim 5, wherein the predetermined integer is about four.

* * * * *